United States Patent [19]

Grant

[11] Patent Number: 4,565,857

[45] Date of Patent: Jan. 21, 1986

[54] RADIATION-CURABLE CELLULOSE COATING

[75] Inventor: Richard J. Grant, Maplewood, Minn.

[73] Assignee: Minnesota Mining and Manufacturing Company, St. Paul, Minn.

[21] Appl. No.: 673,872

[22] Filed: Nov. 21, 1984

[51] Int. Cl.$^4$ .................. C08G 18/06; C08G 18/28; C08L 1/10; C09D 3/72
[52] U.S. Cl. ..................... 527/301; 536/30; 536/32
[58] Field of Search ............... 527/301; 536/30, 32

[56] References Cited

U.S. PATENT DOCUMENTS

| | | | |
|---|---|---|---|
| 2,647,884 | 8/1953 | Wystrach | 527/301 |
| 2,821,544 | 1/1958 | Holtschmidt et al. | 260/486 |
| 3,311,608 | 3/1967 | Murphy | 536/32 |
| 3,475,356 | 10/1969 | Davis et al. | 527/301 |
| 3,749,592 | 7/1973 | Gaske et al. | 427/36 |
| 3,782,950 | 1/1974 | Ranz et al. | 96/85 |
| 4,066,828 | 1/1978 | Holst et al. | 527/301 |
| 4,112,182 | 9/1978 | Newland et al. | 428/336 |
| 4,147,603 | 4/1979 | Pacifici et al. | 204/159.12 |
| 4,233,425 | 11/1980 | Tefertiller et al. | 525/408 |
| 4,404,347 | 9/1983 | Nakamura et al. | 527/301 |
| 4,407,855 | 10/1983 | Russell | 427/54.1 |

FOREIGN PATENT DOCUMENTS

| | | | |
|---|---|---|---|
| 50-48091 | 4/1975 | Japan | 527/301 |
| 54-43299 | 4/1979 | Japan | 527/301 |
| 656643 | 8/1951 | United Kingdom | 536/32 |

OTHER PUBLICATIONS

A. E. Staley Mfg. Co., trademark Stalink TM. (Product Bulletin).
Casarett and Doull's, *Toxicology*, Macmillian Publishing Col, Inc., NY 1980, p. 533.
Brust, J. M., ed., *Developments in Polyurethane*-1, Applied Science Publishers Ltd., London, 1978, pp. 253-267.
Dow Chemical Company Product Bulletin, "Developmental Monomer XAS-10743.00, Isocyanatoethyl Methacrylate, C.A.S. No. 030674-80-7".
*Useful Facts and Figures*, 3rd Ed., Technical Publication No. MSB 111-38, Reliance Universal, Inc., Louisville, KY, pp. 15-17.
E. Levine, "Formulating Ultraviolet Curable Coatings", Modern Paint and Coatings, Aug. 1983, 26-29.
R. S. Bailey, "UV Cured Coatings for Wood Furniture", Radiation Curing, Nov. 1983, 14-17.

*Primary Examiner*—Ronald W. Griffin
*Attorney, Agent, or Firm*—Donald M. Sell; James A. Smith; Carole Truesdale

[57] ABSTRACT

Ethylenically unsaturated cellulose esters are provided. These ethylenically unsaturated cellulose esters are the reaction product of a cellulose ester having unreacted hydroxyl groups and a polymerizable ethylenically unsaturated compound having an isocyanato group reactive with the hydroxyl groups of the cellulose ester. The product is substantially free of unreacted isocyanate groups and is particularly useful in protective coatings.

18 Claims, No Drawings

RADIATION-CURABLE CELLULOSE COATING

This invention relates to protective, organic coatings for wood and other substrates. This invention, in another aspect, relates to radiation-curable cellulose coatings and substrates prepared with such coatings.

Protective coatings for various substrates such as plastic, wood, and metal are well known and a wide variety of coating compositions have been used in the past. Some protective coatings serve a number of different purposes such as providing abrasion and scratch resistance and protection against water spotting and solvent damage. Two important types of protective coatings are lacquer-type or reactive-type coatings.

Lacquer-type coating compositions are provided as a solvent solution of solid thermoplastic resins, either naturally occurring resins, e.g., shellac, or synthetic resins, e.g., nitrocellulose. The lacquer-type coating is obtained by coating a substrate with the resin solution and allowing the solvent to evaporate. By using these lacquer-type coating compositions, coatings are obtained that can, in many examples, be sanded, buffered and polished. The coating, even though it may be somewhat abrasion resistant, is still soluble in certain solvents and therefore readily damaged by solvent.

The reactive-type coating compositions are provided as one or more compounds, oligomers or polymers which contain polymerizable or reactive functional groups such as ethylenic unsaturation (e.g., acrylate or methacrylate groups), epoxy, isocyanato, carboxylic acid, and hydroxyl groups, that can react to chain-extend and/or crosslink to form the protective coating. In some cases, the reaction can take days before the coating has achieved the desired hardness or degree of cure. Compositions containing ethylenic unsaturation can be cured by heat or radiation, e.g, ultraviolet light or electron beam radiation. Such compositions cured by ultraviolet light require the presence of a photoinitiator, while those cured with electron beam radiation do not require a photoinitiator. Radiation cured coatings often take only seconds or minutes to cure to yield the final desired properties. See for example, E. Levine, "Formulating Ultraviolet Curable Coatings", Modern Paint and Coatings, August 1983, 26–29; R. S. Bailey, "UV Cured Coatings for Wood Furniture", Radiation Curing, November 1983, 14–17; U.S. Pat. No. 4,407,855 (Russell) (and references cited therein), U.S. Pat. No. 4,417,603 (Pacifici et al) and U.S. Pat. No. 3,749,592 (Gaske, et al).

Such prior art radiation curable coatings are useful in providing various degrees of protection against solvents, stains and abrasion, but all suffer from one or more disadvantages. For example, those coatings prepared from blends of ethylenically unsaturated oligomers and monomers are wet or tacky after coating and thus are susceptible to the pickup of dust particles or foreign matter until crosslinked by radiation and the appearance of the coating can be detrimentally affected. After crosslinking, imperfections which may be present in the insoluble, radiation cured, hard coatings are difficult to correct such as by sanding and buffing, and defects cannot be repaired by removal of the coating by solvents.

In U.S. Pat. No. 3,749,592, (Gaske et al.) lacquer coatings based on cellulose derivatives mixed with unsaturated monoisocyanates are described which provide an easily workable solid film in solvent soluble thermoplastic form which can be physically worked for various purposes which are conventional to the lacquer art and which can thereafter be exposed to radiation to cure the film to increase the solvent resistance and physical toughness of the film and thereby produce a more durable film which is difficult to work. However, some of these coatings may not develop sufficient solvent resistance, heat resistance or abrasion resistance in the final photocured coating. Also, the coating mixtures contain unreacted isocyanato groups which can cause toxicological problems.

Another class of reactive coatings are the urethane polyethers which can be polymerized by actinic radiation and/or chemical initiation. For example, Tefertiller et al (U.S. Pat. No. 4,233,425) describe addition polymerizable polyethers having a polyether backbone and at least one pendant ethylenically unsaturated aliphatic urethane group, such as the reaction product of a polyether polyol and 2-isocyanatoethyl methacrylate. These coatings may be subject to damage by extended contact with some solvents. Dow Chemical Company product bulletin "Developmental Monomer XAS-10743.00, Isocyanatoethyl Methacrylate, C.A.S. Number 030674-80-7" further describes isocyanatoethyl methacrylate.

Other reactive-type coatings include cellulose derivatives, such as hydroxypropyl cellulose, reacted with isocyanatoethyl methacrylate as described in U.S. Pat. No. 3,782,950 (Ranz et al.) and cellulose esters modified with an unsaturated carboxylate moiety as disclosed in U.S. Pat. No. 4,112,181 (Newland et al.). The coatings taught in these patents may not develop the desired solvent resistance or abrasion resistance in the cured coatings. Various coatings, including cellulose-based coatings are disclosed in *Useful Facts and Figures*, 3rd Ed., Technical Publication No. MSB 111-38, Reliance Universal, Inc., Louisville, KY, pp 15–17.

A further class of polymerizable coatings are those containing polymerizable acrylamidomethyl cellulose esters available from A. E. Staley Mfg. Co. under the trademark Stalink ™. In its product bulletin, distributed at a trade show, "Radcure '84", in Atlanta, GA, during Sepember 1984, this company describes the acrylamidomethyl cellulose esters as cellulose ester

While providing some improvement in solvent resistance and abrasion resistance in cured coatings, some of such coatings were found not to provide the high degree of solvent resistance and abrasion resistance desired for some end use applications.

Other deficiencies in many known protective coatings are darkness of coating color and/or lack of clarity, because the coatings include components which are colored or develop color on curing, or are incompatible, i.e., not mutually soluble, with each other.

In accordance with the invention, polymerizable ethylenically unsaturated cellulose esters are provided which under the influence of activating energy, such as ultraviolet radiation, polymerize to materials which have excellent solvent resistance and abrasion resistance. Such ethylenically unsaturated cellulose esters are prepared by the reaction of (a) a cellulose ester of cellulose and saturated aliphatic monocarboxylic acids having 2 to 4 carbon atoms or aromatic monocarboxylic acids, said cellulose ester having an average of about 0.1 to 2.0, preferably 0.25 to 1.0, unreacted hydroxy groups per anhydroglucose unit, and (b) a polymerizable ethylenically unsaturated compound having an isocyanato group reactive with the hydroxyl groups of the cellulose ester such that the reaction product is substantially free of unreacted isocyanato groups, i.e., preferably containing less than 1.0% unreacted isocyanato groups, more preferably less than 0.5% unreacted isocyanato groups, most preferably no unreacted isocyanato groups, as detected by titration or infrared analysis. Preferably, about 30 to 100 percent, more preferably 50 to 100 percent, most preferably 70 to 100 percent of the free hydroxyl groups of the cellulose ester (a) are reacted with the isocyanato groups of the polymerizable ethylenically unsaturated compound (b).

Further provided are coating compositions comprising the above-described ethylenically unsaturated cellulose ester and an effective catalytic amount of a polymerization catalyst. There is also provided a process for providing a substrate with a protective coating that is resistant to solvents and abrasion comprising the steps of coating the substrate with a coating composition comprising ethylenically unsaturated cellulose ester described above and a polymerization catalyst, and curing the applied coating by exposure of the coating to suitable activating energy.

These ethylenically unsaturated cellulose esters are particularly useful in protective coatings because of their excellent solvent resistance and abrasion resistance. The ethylenically unsaturated cellulose esters of the invention are also useful as adhesives, sealers, binders, and impregnating compositions.

The polymerizable ethylenically unsaturated cellulose esters of the invention are the condensation or addition product of
a cellulose ester (a) of cellulose and $C_2$ to $C_4$ saturated aliphatic monocarboxylic acids or aromatic monocarboxylic acids, e.g., benzoic acid, this cellulose ester having an average of 0.1 to 2.0, preferably 0.25 to 1.0, unreacted hydroxyl groups per anhydroglucose unit (AGU) of the cellulose, i.e.,

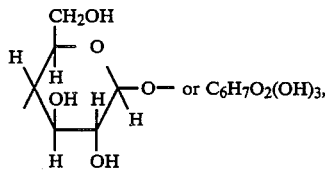

or $C_6H_7O_2(OH)_3$, with
about 30 to 100 percent of the stoichiometric amount of polymerizable ethylenically unsaturated compound (b) having an isocyanato functional group reactive with the hydroxyl groups of the cellulose ester, to yield a polymerizable ethylenically unsaturated cellulose ester wherein preferably about 30 to 100 percent, more preferably 70 to 100 percent, of the free hydroxyl groups have been converted to polymerizable unsaturated groups.

A class of the polymerizable ethylenically unsaturated cellulose esters, can be represented by the following formula:

$$[C_6H_7O_2(OR^1)_x(OR^2)_{3-x}]_n \qquad \text{I}$$

wherein each $R^1$ is independently selected from hydrogen

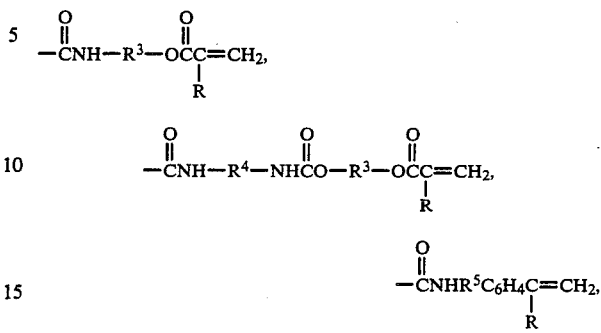

in which
R is H or —$CH_3$;
$R^3$ is an alkylene group having 2 to 12 carbon atoms;
$R^4$ is a divalent organic group selected from linear, branched, and cyclic alkylene groups having 2 to 40 carbon atoms, phenylene groups, naphthalene groups, and phenylenemethylenephenylene groups, the organic group can be optionally substituted by up to four lower alkyl groups having 1 to 4 carbon atoms;
$R^5$ is a divalent organic group having 1 to 6 carbon atoms selected from saturated or unsaturated straight or branched aliphatic or cycloaliphatic groups or aromatic groups;
each $R^2$ is independently selected from

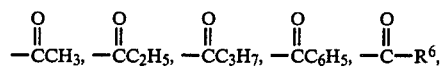

$R^6$ is a monovalent organic radical having 1 to 24 carbon atoms selected from saturated or unsaturated straight or branched aliphatic groups or aromatic groups;
x is 0.1 to 2.0;
n is a number of at least about 20 or larger, and the various $OR^1$ and $OR^2$ groups are randomly distributed in the n subunits, i.e., substituted anhydroglucose units, of the cellulose ester.

These ethylenically unsaturated cellulose esters have an unsaturation equivalent weight of less than about 1000, preferably less than about 500.

A preferred subclass of formula I is $$[C_6H_7O_2(OCCH_3)_a(OR^2)_b(OR^1)_x]_n \qquad \text{II}$$

where $R^2$ is independently selected from

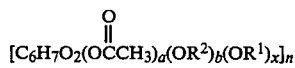

$R^1$, n and x are as defined for formula I, and the sum of a and b is $3-x$, each of a and b are 0 to 2.9, and the a, b and x groups are randomly distributed in the n subunits of the cellulose ester.

The preparation of the ethylenically unsaturated cellulose ester is illustrated in the following reactions schemes where R, $R^1$ through $R^6$, a, b, x and n are as defined above for general formulas I and II.

Scheme 1

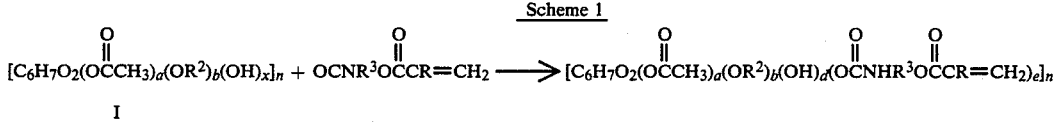

where
d + e = x and e > d
n ≧ 20

Scheme 2

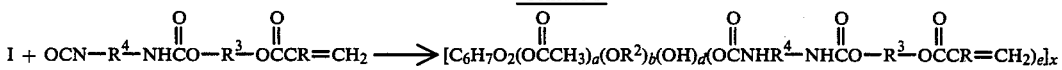

The preferred hydroxyl group-containing cellulose ester starting materials for conversion to the polymerizable ethylenically unsaturated cellulose esters are cellulose acetate, cellulose acetate propionate and cellulose acetate butyrate. They are available in various molecular weights (generally characterized by solution viscosities) and various degrees of substitution with respect to acetate, propionate, butyrate and residual or unreacted hydroxyl groups. Particularly useful cellulose acetate propionate (CAP) and cellulose acetate butyrate (CAB) cellulose ester resins include CAP-504-0.2, CAP-482-0.5, CAB-551-0.1, CAB-553-0.4, and CAB-381-0.5 resins commercially available from Eastman Chemical Products, Inc.

Representative isocyanato group-containing polymerizable ethylenically unsaturated compounds having hydroxyl-reactive functional groups which can be used to prepare the ethylenically unsaturated cellulose ester by reaction with hydroxyl-containing cellulose esters, e.g., CAP AND CAB, include 2-isocyanatoethyl acrylate, 3-isocyanatopropyl acrylate, 2-isocyanatoethyl methacrylate, 3-isocyanatopropyl methacrylate and, 1-(1-isocyanato-1-methylethyl)-3-(1-methylethenyl)-benzene. Additionally, the following polymerizable ethylenically unsaturated adducts can be used, which adducts are prepared from one mole of monohydroxy-substituted acrylates or methacrylates and one mole of a diisocyanate, e.g., 2-[(4-isocyanatophenyl)aminocarbonyloxy]ethyl acrylate and methacrylate, 2-(5-isocyanato-1,3,3-trimethylcyclohexylmethylaminocarbonyloxy)ethyl acrylate and methacrylate, 2-(6-isocyanatohexylaminocarbonyloxy)ethyl acrylate and methacrylate, and 2[(3-isocyanato-4-methylphenyl)aminocarbonyloxy]ethyl acrylate and methacrylate and mixtures thereof. Particularly preferred are isocyanatoethyl acrylate and isocyanatoethyl methacrylate.

Other polymerizable ethylenically unsaturated compounds which can be reacted with the hydroxyl-containing cellulose esters in addition to the isocyanato group-containing compounds include acrylic acid, methacrylic acid, crotonic acid, acryloyl chloride, methacryloyl chloride, crotonyl chloride, acrylic anhydride, methacrylic anhydride, crotonic anhydride. These compounds which do not contain isocyanato groups can be present in minor amounts, i.e., amounts which do not adversely affect the solvent resistance or abrasion resistance of coatings prepared from the resulting ethylenically unsaturated cellulose ester.

The reaction of the hydroxyl groups of the cellulose acetate, cellulose acetate propionate, and cellulose acetate butyrate resins with the isocyanate group-containing hydroxyl-reactive polymerizable unsaturated reagents is carried out under urethane bond-forming conditions in solvents such as esters, ketones, chlorinated solvents and ethers at a resin concentration of about 15–45 weight percent, depending on solution viscosity.

Properties can be further modified by reacting a portion of the hydroxyl groups with other reagents to increase such properties as hardness, flexibility, solvent resistance, and compatibility. Preferred reagents include isocyanates such as optionally substituted aromatic, straight chain or cycloaliphatic. Small amounts of difunctional isocyanates may also be used providing the gel point is not passed.

Polymerization initiators are generally required as part of the radiation curable compositions of this invention except when curing is carried out by electron beam irradiation. Polymerization initiators, suitable for use in the cross-linkable compositions of the invention are those compounds which liberate or generate a free-radical on addition of energy. Such catalysts include peroxy, azo, and redox systems all of which are well known and are described frequently in polymerization art. Included among free-radical catalysts are the conventional heat activated catalysts such as organic peroxides and organic hydroperoxides; examples are benzoyl peroxide, tertiary-butyl perbenzoate, cumene hydroperoxide, azo-bis(isobutyronitrile) and the like. The preferred catalysts are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and 2-hydroxy-2-methyl-1,2-diphenylethanone; diketones such as benzil and diacetyl, etc.; phenones such as acetophenone, 2,2,2-tribromo-1-phenylethanone, 2,2-diethoxyacetophenone, 2,2-dimethoxy-2-phenylacetophenone, 2,2,2-tribromo-1-(2-nitrophenyl)ethanone, benzophenone, and 4,4′-bis(-dimethylamino)benzophenone, and 1-hydroxycyclohexylphenyl ketone. Normally, the initiator is used in amounts ranging from about 0.01 to 10% by weight of the total polymerization composition. When the quantity is less than 0.01% by weight, the polymerization rate becomes extremely low. If the initiator is used in excess of about 10% by weight, no correspondingly improved affect can be expected. Thus, addition of such greater quantity is not economically justified. Preferably, about 0.25 to 5% of initiator is used in the polymerizable composition.

The photopolymerization of the composition of the invention occurs on exposure of the composition to any source of radiation emitting actinic radiation at a wavelength within the ultraviolet and visible spectral regions and by infrared radiation, i.e. thermal energy. Suitable sources of radiation include mercury, xenon, carbon arc and tungsten filament lamps, sunlight. Exposures may be from less than about one second to ten minutes or more depending upon the amounts of particular polymerizable materials, the photopolymerization catalyst being utilized, the radiation source, the distance of the composition from the source and the thickness of the coating to be cured. The compositions may also be polymerized by exposure to electron beam irradiation. Generally speaking, the dosage necessary is from less than 1 megarad to 30 megarads or more. An advantage of curing with electron beam irradiation is that highly pigmented compositions can be effectively cured at a faster rate than by mere exposure to actinic radiation.

The radiation curable compositions of this invention and optional polymerization initiator can, but do not have to be, formulated with polymerizable ethylenically unsaturated modifying monomers to enhance the properties of the coatings, e.g., hardness, flexibility, and adhesion. Such monomers may also be used as reactive diluents. Suitable ethylenically unsaturated monomers which can be used include methyl methacrylate, ethyl acrylate, 2-ethylhexyl acrylate, chlorohexyl acrylate, styrene, 2-chlorostyrene, 2,4-dichlorostyrene, acrylic acid, acrylamide, acrylonitrile, t-butyl acrylate, methyl acrylate, butyl acrylate, 2-(N-ethylcarbamyl)ethyl methacrylate. Other modifying monomers that can be incorporated into the composition of the invention include 1,4-butylene diacrylate or dimethacrylate, ethylene glycol diacrylate and dimethacrylate, hexanediol diacrylate or dimethacrylate, glyceryl diacrylate or dimethacrylate, glyceryl triacrylate or trimethacrylate, pentaerythritol triacrylate or trimethacrylate, diallyl phthalate, dipentaerythritol pentaacrylate, neopentylglycol diacrylate, 1,3,5-tri(2-methacryloyloxyethyl)-s-triazine. Generally, up to about 90 percent by weight of modifying monomers per part by weight of blend of the composition can be used.

In addition to the reactive monomers described above, other modifying polymerizable ethylenically unsaturated coreactants can be used in the radiation curable compositions of this invention, such coreactants including acrylated epoxy, acrylated polyester, and acrylated urethane oligomers and resins. The compositions of the invention can also include (besides the monomers, oligomers, and resins mentioned above), a variety of additives utilized for their known purposes, such as stabilizers, inhibitors, lubricants, flexibilizers, pigments, dyes, and fillers such as finely divided silica, diatomaceous earth, metal oxides, fiberglass, glass bubbles, and talc. Fillers can generally be used in proportions up to about 200 percent by weight of the curable composition but preferably are used up to about 50 percent by weight. It is desirable that the above optional additives be transparent to the radiation.

Coating formulations of this invention comprising the ethylenically unsaturated cellulose ester and, when required, polymerization initiator, and other optional additives, are generally prepared by simple mixing, in the desired proportions, organic solvent solutions of the ethylenically unsaturated cellulose ester, with addition of if required, and other optional ingredients. The solvents used are usually the solvents in which the ethylenically unsaturated cellulose ester was prepared, e.g. methyl ethyl ketone, propyl acetate, although other solvents may be used as well, e.g., by removing and replacing reaction solvents, or by adding additional solvents of choice. If reactive modifying monomers are used, solvents may not be required. The actual choice of solvents, and whether any solvent is required, will usually depend on the coating method.

Coating of the radiation curable compositions of this invention on various substrates can be carried out by known procedures such as spraying, dipping, brushing, curtain coating and the like. Substrates which can be coated include plastics, metals, ceramics and wood. The cured, crosslinked or insoluble coatings of this invention are particularly valuable in coatings for finished wood articles, e.g., furniture, to impart solvent, stain and abrasion resistance thereto.

After coating, the solvent, if present, is allowed to evaporate, with added heat and the use of a forced air stream where necessary, until the coating is dry to form an intermediate coating. Additional intermediate coatings may be applied if desired to increase coating thickness. At this point, in the case of a coated finished wood article, the solid, intermediate stage coated surface can be repaired, if necessary, i.e. the coating may be removed with solvent and the article recoated, or it can be sanded, buffed and polished to achieve the desired appearance.

Curing of the intermediate stage coating to achieve final properties of solvent, stain and abrasion resistance is generally carried out by exposure to ultraviolet radiation, e.g., exposure to 80 watt/cm medium pressure mercury lamps, generally by passing the coated article on a conveyor belt under the lamps one or more times.

The following specific, but nonlimiting examples will serve to illustrate the present invention.

EXAMPLE 1

To a dry one quart, narrow mouth, glass bottle were charged 458 g of a 40 weight percent solution of cellulose acetate butyrate (CAB-553-0.4 containing 47% butyryl, 2% acetyl, and 4.3% hydroxyl groups, 0.46 equivalent based on hydroxyl groups) in anhydrous methyl ethyl ketone followed by 134.5 g (0.35 mole) of a 40 weight percent solution of isocyanatoethyl methacrylate in methyl ethyl ketone, 60 mg of the monomethyl ether of hydroquinone and 120 mg of dibutyltin dilaurate. The bottle was purged with dry air, sealed, and placed in a water bath for heating and agitation, using a "Launder-O-Meter" for this purpose. After heating at 70° C. for 16 hours, the bottle was removed from the water bath and cooled to room temperature. Infrared analysis of a small sample of the reaction solution showed no unreacted isocyanate groups present, indicating completion of the hydroxyl/isocyanatoethyl methacrylate reaction and preparation of cellulose acetate butyrate urethane-methacrylate, with about 76% of the available hydroxyl groups of the starting cellulose ester converted to urethane-methacrylate functional groups. The calculated ethylenic unsaturation equivalent weight and amount of unreacted —NCO as determined by infrared analysis are shown in Table 1.

EXAMPLE 2

Example 1 was repeated using 195 g propyl acetate, 75.4 g (0.19 equivalent) of cellulose acetate butyrate (CAB-553-0.4) 50 mg of monomethyl ether of hydroquinone, 29.6 g (0.19 mole) of isocyanatoethyl methacrylate, and 50 mg dibutyltin dilaurate. After heating for 28 hours at 65° C., the bottle was removed and cooled to room temperature. Infrared analysis of a small sample of the reaction solution showed no unreacted isocyanate groups present, indicating completion of the reaction and preparation of the cellulose acetate butyrate urethane-methacrylate, with 100% of the available hydroxyl groups of the starting cellulose ester converted to urethane-methacrylate functional groups. The calculated ethylenic unsaturation equivalent weight and the amount of unreacted —NCO are shown in Table 1.

EXAMPLE 3

The procedure of Example 1 was followed except that cellulose acetate propionate (CAP-504-0.2, containing 41% propionyl, 3% acetyl, 5.1% hydroxyl groups, with a falling ball viscosity of 0.2 second), was used as starting material instead of cellulose acetate butyrate.

The following materials were charged to the reaction bottle: 181.2 g (0.54 equivalent) of CAP-504-0.2 in 271.8 g of methyl ethyl ketone, 53.2 g (0.34 equivalent) of isocyanatoethyl methacrylate in 79.8 g methyl ethyl ketone, 50 mg of monomethyl ether of hydroquinone and 120 mg of dibutyltin dilaurate.

After reaction and analysis, as described in Example 1, the cellulose acetate propionate urethane-methacrylate was obtained in which about 63% of the available hydroxyl groups of the starting cellulose ester had been converted to urethane-methacrylate functional groups. The calculated ethylenic unsaturation equivalent weight and the amount of unreacted —NCO are shown in Table 1.

EXAMPLE 4

Example 3 was repeated except that the quantities and relative amounts of reactants were as follows: 83.2 g (0.25 equiv.) of CAP-504-0.2 in 124.2 g methyl ethyl ketone, 39 g (0.25 equiv.) isocyanatoethyl methacrylate in 58.5 g methyl ethyl ketone, 60 mg of monomethyl ether of hydroquinone, and 120 mg of dibutyltin dilaurate.

After reaction and analysis as described in Example 1, the cellulose acetate propionate urethane-methacrylate was obtained in which 100% of the available hydroxyl groups of the starting cellulose ester had been converted to urethane-methacrylate functional groups. The calculated ethylenic unsaturation equivalent weight and the amount of unreacted —NCO are shown in Table 1.

EXAMPLE 5

The procedure of Example 3 was allowed except that 2-isocyanatoethyl acrylate was used instead of isocyanatoethyl methacrylate. The preparation of isocyanatoethyl acrylate is detailed in U.S. Pat. No. 2,821,544 which is incorporated herein by reference. The purity of the isocyanatoethyl acrylate was 93% as determined by gas chromatography.

The following materials were charged to the reaction bottle: 60 g propyl acetate, 28.1 grams (0.084 equivalent based on hydroxyl) of CAP-504-0.2, 11.9 grams (93% purity is 0.078 mole) of isocyanatoethyl acrylate, 10 mg monomethyl ether of hydroquinone, and 2 drops dibutyltin dilaurate. After reaction and analysis as described in Example 1, cellulose acetate propionate urethane-acrylate was obtained in which 93% of the available hydroxyl groups of the starting cellulose ester had been converted to urethane-acrylate functional groups. Based on the isocyanatoethyl acrylate purity of 93%, the ethylenic unsaturation equivalent weight was calculated and is shown in Table 1 together with the amount of unreacted —NCO.

EXAMPLE 6

The procedure of Example 1 was followed except that cellulose acetate (CA-398-3, containing 39.8% acetyl and 3.5% hydroxyl groups, hydroxyl equivalent weight, 486, with a falling ball viscosity of 3 seconds), was used as starting material instead of cellulose acetate butyrate. The following materials were charged to the reaction bottle: 45.5 g (0.094 equivalent) of CA-398-3, 240 g acetone, 14.5 g (0.094 mole) of isocyanatoethyl methacrylate, 50 mg of monomethyl ether of hydroquinone and 90 mg of dibutyltin dilaurate. After reaction and analysis, as described in Example 1, the cellulose acetate urethane-methacrylate was obtained in which 100% of the available hydroxyl groups of the starting cellulose ester had been converted to urethane-methacrylate functional groups. The calculated ethylenic unsaturation equivalent weight and amount of unreacted —NCO are shown in Table 1.

EXAMPLE 7

To a 500 ml flask fitted with a thermometer, magnetic stirring bar, dropping funnel and a calcium chloride drying tube were added 86.4 g (0.514 mole) of hexamethylene diisocyanate, 78 g propyl acetate, 50 mg monomethyl ether of hydroquinone, and 50 mg of dibutyltin dilaurate. The solution was heated to 50° C. and 65.5 g (0.565 mole) of hydroxyethyl acrylate were added dropwise over 2 hours. Heating was continued for an additional 16 hours to complete the reaction, and the resulting intermediate, 2-(6-isocyanatohexylaminocarbonyloxy)ethyl acrylate, was then reacted with a hydroxyl-functional cellulose ester. To a dry 8 ounce, narrow mouth glass bottle were charged 33.3 g (0.1 equivalent) of cellulose acetate propionate (CAP-504.0.2) and 83 g of propyl acetate. The bottle was sealed and placed in a water bath for heating and agitation, using a "Launder-O-Meter" for this purpose. After heating at 60° C. for 16 hours, the bottle was removed and cooled to room temperature. To this solution were added 24.9 g (0.05 equivalent based on isocyanate) of the previously prepared isocyanato-acrylate. The bottle was purged with dry air, sealed, and again placed in the Launder-O-Meter at 60° C. for 24 hours. The bottle was then removed, cooled to room temperature, and found to contain no residual isocyanate by infrared analysis. The calculated ethylenic unsaturation equivalent weight and the amount of unreacted —NCO are shown in Table 1.

COMPARATIVE EXAMPLE 1

To a 250 ml flask fitted with mechanical stirrer, thermometer, reflux condenser and dropping funnel were added 71 g of anhydrous acetone solvent. The solvent was heated to 50° C. and 26 g (0.078 equivalent based on hydroxyl content) of previously dried cellulose acetate propionate (CAP-504-0.2) were added slowly with stirring under a dry air atmosphere. After a homogeneous solution was obtained after about 30 minutes, the flask contents were cooled to 20° C. and 9.17 g (0.091 mole) of triethylamine and 50 mg of the monomethyl ether of hydroquinone polymerization inhibitor were added. A solution of 10.3 g acryloyl chloride (0.114 mole) in 40 ml of acetone was then added over 30 minutes. A white precipitate began to form immediately and the reaction temperature rose to 33° C. The reaction mixture was heated to 40° C. and stirred at that temperature overnight. The reaction mixture was diluted with 20 ml acetone and precipitated into 600 ml of water. The solid product was collected by suction filtration, re-slurried in 600 ml water, again collected by suction filtration, and air dried. The product had an acrylate content of 9.9% by proton NMR, which corresponds to an ethylenic unsaturation equivalent weight of 717.

COMPARATIVE EXAMPLE 2

Comparative Example 1 was repeated using 210 g methyl ethyl ketone solvent, 50 g (0.15 equivalent) of cellulose acetate propionate (CAP-504-0.2), 50 mg of monomethyl ether of hydroquinone, 15.9 g (0.157 mole) of triethylamine, and 14.3 g (0.158 mole) of acryloyl chloride. The reaction was heated at 65°–70° C. for 16 hours, and an additional 1.59 g (0.016 mole) of triethylamine and 1.43 g (0.016 mole) of acryloyl chloride were added and the reaction continued for 3 hours at 70° C. The product was precipitated, washed and vacuum dried as in Comparative Example 1. The product had an acrylate content of 15.2% by proton NMR, which corresponds to an ethylenic unsaturation equivalent weight of 467.

COMPARATIVE EXAMPLE 3

Comparative Example 1 was repeated using 63 g acetone, 25.5 g (0.077 equivalent) cellulose acetate propionate (CAP-504-0.2, 50 mg of monomethyl ether of hydroquinone, 9.3 g (0.092 mole) triethylamine, and 12.0 g (0.115 mole) of methacryloyl chloride in 25 ml of acetone. After heating at 40 degrees for 16 hours, the product was precipitated in water, collected by suction filtration, rewashed with water and again collected, and vacuum-dried overnight. The product had a methacrylate content of 9.4% by proton NMR, which corresponds to an ethylenic unsaturation equivalent weight of 904.

COMPARATIVE EXAMPLE 4

Comparative Example 1 was repeated using 220 g methyl ethyl ketone, 30 g (0.062 equivalent) cellulose acetate (CA-398-3), 50 mg monomethyl ether of hydroquinone, 13.7 g (0.136 mole) of triethylamine, and 12.3 g (0.136 mole) of acryloyl chloride. After heating at 60° C. for 6 hours, the product was precipitated in water, collected by suction filtration, rewashed with water and finally methanol, and air dried overnight. The product had an acrylate content of 11.1% by proton NMR, which corresponds to an ethylenic unsaturation equivalent weight of 638.

COMPARATIVE EXAMPLE 5

Comparative Example 1 was repeated using 180 g of methyl ethyl ketone, 39.5 g (0.10 equivalent) of cellulose acetate butyrate (CAB-553-0.5), 50 mg monomethyl ether of hydroquinone, 22.2 g (0.22 mole) of triethylamine, and 19.9 g (0.22 mole) of acryloyl chloride. After heating at 60° C. for 6 hours, the resulting product was precipitated and filtered, washed with water and methanol, and air dried overnight. The product had an acrylate content of 14.9% by proton NMR, which corresponds to an ethylenic unsaturation equivalent weight of 477.

COMPARATIVE EXAMPLE 6

A coating as described in Example 2 of U.S. Pat. No. 3,749,592 was prepared by mixing together 100 parts ½ second nitrocellulose, 165 parts toluol, 130 parts 2-ethoxy ethyl acetate (urethane grade), 140 parts ethyl acetate (urethane grade), and 32 parts hydroxyethyl acrylate-toluene diisocyanate adduct (1.1:1 mol ratio). To 20 g of the resulting mixture were added 0.25 g benzophenone, 15 g butyl acetate, and 2.0 g polycaprolactone triol (PCP-0300, available from Union Carbide Corp.) adducted with three molar proportions of a toluene diisocyanate/hydroxyethyl acrylate monoisocyanate adduct (1:1 mol ratio). The calculated unsaturation equivalent weight was 1015.

COMPARATIVE EXAMPLE 7

The coating solution of Example 6 was repeated using cellulose acetate butyrate (CAB-553-0.4) as a replacement for the nitrocellulose, and ethyl acetate as a replacement for the toluene. The calculated ethylenic unsaturation equivalent weight and amount of unreacted —NCO are shown in Table 1.

TABLE 1

| Example | EUE[a] | % unreacted —NCO[b] |
|---|---|---|
| 1 | 677 | 0 |
| 2 | 550 | 0 |
| 3 | 689 | 0 |
| 4 | 488 | 0 |
| 5 | 499 | 0 |
| 6 | 641 | 0 |
| 7 | 813 | 0 |
| Comp 7 | 1015 | 2.0 |

[a]calculated ethylenic unsaturation equivalent weight
[b]unreacted —NCO as determined by infrared analysis in Examples 1 to 7 and by titration in Comparative Example 7.

Each of the above coating compositions was evaluated for abrasion resistance and solvent resistance according to the following test methods.

Abrasion Resistance: Abrasion resistance was carried out on formulatitons containing 20 percent solids coated on polyester film with a #50 wire wound rod in a single pass. Coated samples were air dried at room temperature for about 18 hours, cured with ultraviolet radiation using a Radiation Polymer Co. U.V. Processor Model QC-1202 by subjection to two passes on a conveyor belt at 9.1 m/min., under two 80 watt/cm medium pressure mercury lamps set at a distance of about 8 cm above the surface of the coating. The coated film was abraded on a Taber Abraser manufactured by Gardner/Neotec Division of Pacific Scientific, using 30 cycles of a CS 17 abrasive wheel with a 500 g load. Abrasion resistance of the cured abraded coatings was determined on a Gardner Hazemeter Model No. XL-211 manufactured by Gardner/Neotec Division of Pacific Scientific, and reported as percent haze in Table 2. The lower the haze value reported, the better the abrasion resistance of the cured coating. The cured coating preferably has a haze value of less than about 30, more preferably less than about 25, most preferably less than about 20.

Solvent Resistance: Curing coated samples of the coatings on polyester film were made as for the abrasion resistance test. An acetone-saturated cotton swab was rubbed back and forth across the sample with moderate pressure. The number of rubs required to remove the coating indicates the solvent resistance. Solvent resistance is preferably at least 25 rubs, more preferably at least 100 rubs, most preferably at least 400 rubs.

COMPARATIVE EXAMPLES 8 AND 9

Twenty weight percent solids solutions of Stalink ™ 105 (Example 8) and Stalink ™ 106 (Example 9), commercially available from A. E. Staley Manufacturing, Inc., were prepared and coated on polyester film as described above and tested for solvent resistance and abrasion resistance.

The abrasion resistance and solvent resistance of each cured coating formulation are shown in Table 2.

TABLE 2

| Example | Solvent resistance (rubs) | Abrasion resistance (% haze) |
| --- | --- | --- |
| 1 | 33 | 29 |
| 2 | 95 | 26 |
| 3 | 25 | 21 |
| 4 | >400 | 20 |
| 5 | >400 | 15 |
| 6 | >400 | 17 |
| 7 | 160 | 21 |
| Comp. 1 | 18 | 24 |
| Comp. 2 | 140 | 23 |
| Comp. 3 | 3 | 26 |
| Comp. 4 | 150 | 29 |
| Comp. 5 | 55 | 29 |
| Comp. 6 | 5 | 30 |
| Comp. 7 | 30 | 23 |
| Comp. 8 | 10 | 24 |
| Comp. 9 | 5 | 31 |

The solvent resistance and abrasion resistance values are functions of not only the unsaturation equivalent weight, but also the physical properties of the starting materials and the extent to which the free hydroxyl groups are reacted. The solubility of the starting cellulose ester increases and the hardness decreases as the ester groups increase in molecular weight from acetate to propionate to butyrate. This is also reflected in the isocyanatoethyl methacrylate substituted products, where the haze values are better (smaller values) for the cellulose acetate based product than the cellulose acetate butyrate based products. In comparing the solvent resistance of the cellulose acetate based products with the cellulose acetate butyrate based products, the cellulose acetate based product (Example 6) has a numerically higher equivalent weight than the cellulose acetate butyrate of Example 2, but has much better solvent resistance. Although Comparative Example 7 showed fair solvent and abrasion resistance, the uncured coating mixture may cause toxicological problems due to the presence of unreacted —NCO (isocyanato) groups as shown in Table 1. (See Casarett and Doull's, *Toxicology*, Macmillian Publishing Co., Inc., NY 1980, p. 533 and Brust, J. M. ed., *Developments in Polyurethane-1*, Applied Science Publishers Ltd., London, 1978, pp. 253-267).

What is claimed is:

1. Ethylenically unsaturated cellulose ester comprising the reaction product of (a) a cellulose ester of cellulose and saturated aliphatic monocarboxylic acids having 2 to 4 carbon atoms or aromatic monocarboxylic acids, said cellulose ester having an average of about 0.1 to 2.0 unreacted hydroxyl groups per anhydroglucose unit, and (b) a polymerizable ethylenically unsaturated compound having an isocyanato group reactive with the hydroxyl groups of the cellulose ester, said reaction product being substantially free of unreacted isocyanate groups.

2. The ethylenically unsaturated cellulose ester of claim 1 having the formula $$[C_6H_7O_2(OR^1)_x(OR^2)_{3-x}]_n$$

wherein each $R^1$ is independently selected from hydrogen

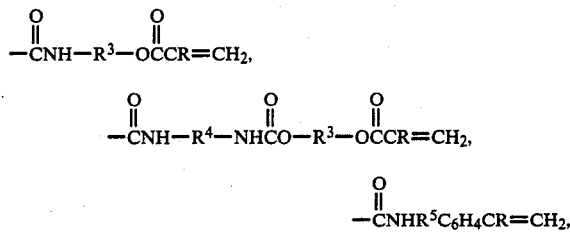

in which

R is H or —$CH_3$;

$R^3$ is an alkylene group having 2 to 12 carbon atoms;

$R^4$ is a divalent organic group selected from linear and branched alkylene groups having 2 to 12 carbon atoms, cyclopentamethylene groups, cyclohexamethylene groups, phenylene groups, naphthalene groups, and phenylenemethylenephenylene groups;

$R^5$ is a divalent organic group having 1 to 6 carbon atoms selected from saturated or unsaturated straight or branched aliphatic or cycloaliphatic groups or aromatic groups;

each $R^2$ is independently selected from

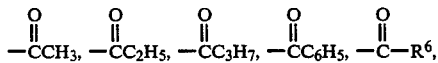

$R^6$ is a monovalent organic radical having 1 to 24 carbon atoms selected from saturated or unsaturated straight or branched aliphatic groups or aromatic groups;

x is 0.1 to 2.0;

n is a number of at least about 20 or larger, the various $OR^1$ and $OR^2$ groups are randomly distributed in the n sub units and said ethylenically unsaturated cellulose ester has an ethylenic unsaturation equivalent weight of less than about 1000.

3. The ethylenically unsaturated cellulose ester of claim 2 having the formula

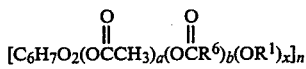

where $R^6$ is independently selected from —$C_2H_5$ and —$C_3H_7$, and the sum of a and b is 3—x, and each of a and b are 0 to 2.9, and the a, b and c groups are randomly distributed in the n subunits of the cellulose ester.

4. The ethylenically unsaturated cellulose ester of claim 2 wherein said organic group $R^4$ is substituted by up to four lower alkyl groups having 1 to 4 carbon atoms and a total of up to 15 carbon atoms.

5. The ethylenically unsaturated cellulose ester of claim 1 having an unsaturated equivalent weight of less than about 500.

6. The ethylenically unsaturated cellulose ester of claim 1 wherein at least 30 percent of the hydroxyl groups of the cellulose ester (a) are reacted with the polymerizable ethylenically unsaturated compound (b).

7. The ethylenically unsaturated cellulose ester of claim 1 wherein cellulose ester (a) is selected from cellulose acetate, cellulose acetate propionate, and cellulose acetate butyrate.

8. The ethylenically unsaturated cellulose ester of claim 1 wherein polymerizable ethylenically unsaturated compound (b) is selected from isocyanatoethyl acrylate, isocyanatoethyl methacrylate, 2-(6-isocyanatohexylaminocarbonyloxy)ethyl acrylate.

9. A coating composition comprising a solution of the ethylenically unsaturated cellulose ester as defined in claim 1 in organic solvent.

10. The ethylenically unsaturated cellulose ester of claim 1 wherein cellulose ester (a) is cellulose acetate propionate and polymerizable ethylenically unsaturated compound (b) is isocyanatoethyl methacrylate.

11. The ethylenically unsaturated cellulose ester of claim 1 wherein polymerizable ethylenically unsaturated compound (b) is 2-(5-isocyanato-1,3,3-trimethylcyclohexylmethylaminocarbonyloxy)ethyl acrylate.

12. The ethylenically unsaturated cellulose ester of claim 1 wherein cellulose ester (a) is cellulose acetate propionate and polymerizable ethylenically unsaturated compound (b) is 2-(5-isocyanato-1,3,3-trimethylcyclohexylmethylaminocarbonyloxy)ethyl acrylate.

13. The ethylenically unsaturated cellulose ester of claim 1 wherein cellulose ester (a) is cellulose acetate propionate and polymerizable ethylenically unsaturated compound (b) is isocyanatoethyl acrylate.

14. The ethylenically unsaturated cellulose ester of claim 1 wherein cellulose ester (a) is cellulose acetate and polymerizable ethylenically unsaturated compound (b) is isocyanatoethyl methacrylate.

15. Ethylenically unsaturated cellulose ester comprising the reaction product of (a) a cellulose ester selected from cellulose acetate, cellulose acetate propionate and cellulose acetate butyrate and (b) a polymerizable ethylenically unsaturated compound selected from isocyanatoethyl acrylate and isocyanatoethyl methacrylate said reaction product being substantially free of unreacted isocyanate groups.

16. A coating composition as claimed in claim 15 further comprising a photoinitiator.

17. A substrate having a cured coating of the composition of claim 5.

18. A substrate having a coating comprising the polymerized product of claim 15 wherein said coating has a solvent resistance of at least 400 rubs with a cotton swab saturated with acetone.

* * * * *

UNITED STATES PATENT AND TRADEMARK OFFICE
CERTIFICATE OF CORRECTION

PATENT NO. : 4,565,857
DATED : January 21, 1986
INVENTOR(S) : RICHARD J. GRANT

It is certified that error appears in the above-identified patent and that said Letters Patent is hereby corrected as shown below:

In the Specification:

Col. 1, line 23, "buffered" should read --buffed--.

Col. 2, line 31, "U.S. Pat. No. 4,112,181" should read --U.S. Pat. No. 4,112,182--.

Col. 6, line 51, "4,4'-bis(-dimethylamino)benzophenone" should read --4,4'-bis(dimethylamino)benzophenone--.

Col. 7, line 17, "modify or" should be inserted after --monomers to --.

In the Claims:

Col. 16, line 18, Claim 17, "of claim 5" should read --of claim 15--.

Signed and Sealed this

First Day of July 1986

[SEAL]

Attest:

DONALD J. QUIGG

Attesting Officer    Commissioner of Patents and Trademarks